Aug. 18, 1970 — T. A. HOSKINS — 3,524,928

HIGH SPEED OPTICAL SCANNING SYSTEM

Filed Aug. 6, 1968 — 2 Sheets-Sheet 1

INVENTOR.
THOMAS A. HOSKINS

BY
ATTORNEY

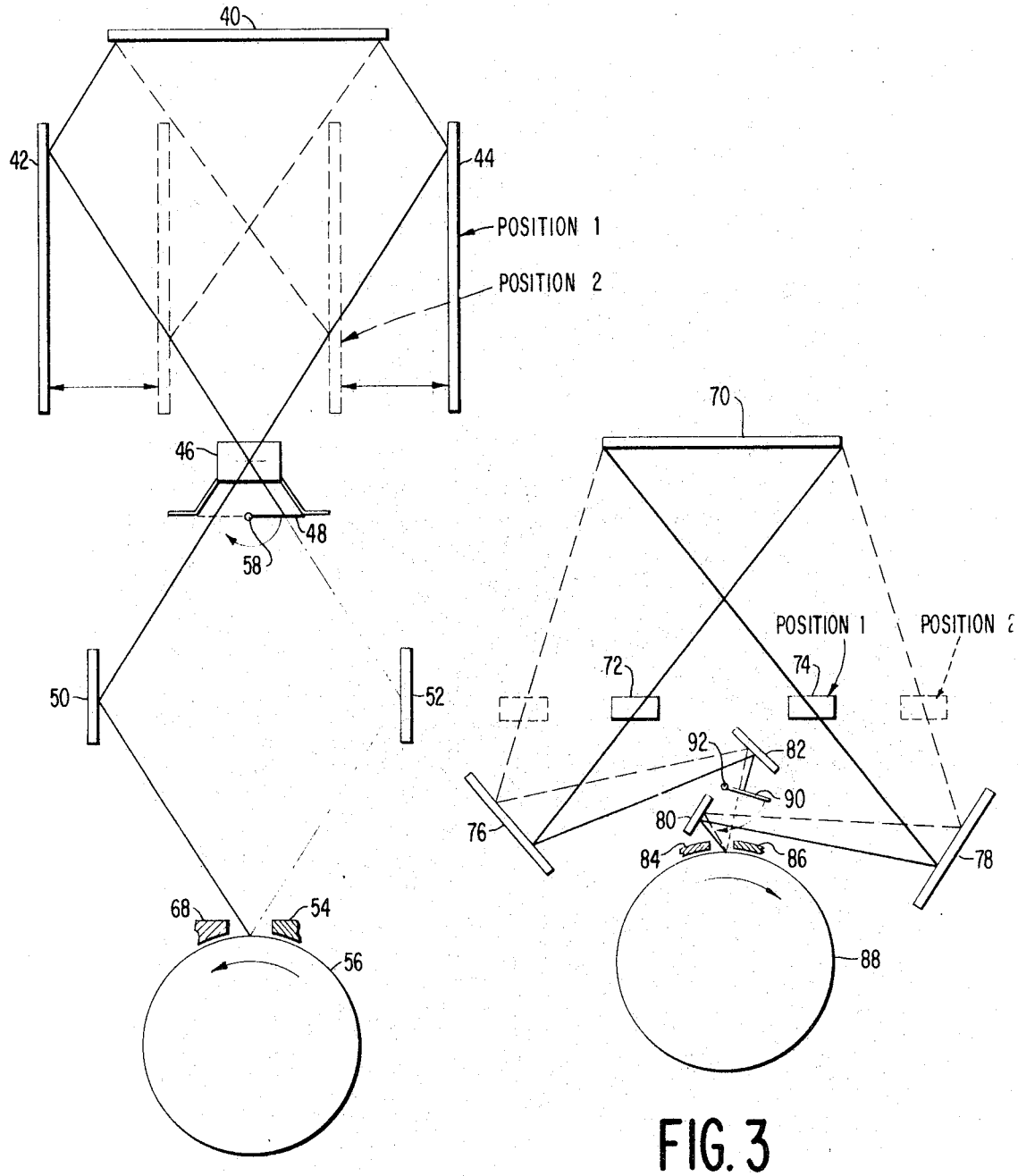

3,524,928
HIGH SPEED OPTICAL SCANNING SYSTEM
Thomas A. Hoskins, Lexington, Ky., assignor to International Business Machines Corporation, Armonk, N.Y., a corporation of New York
Filed Aug. 6, 1968, Ser. No. 750,599
Int. Cl. H04n 1/04
U.S. Cl. 178—7.6                             7 Claims

ABSTRACT OF THE DISCLOSURE

A document scanning system is described which allows successive scans to occur in rapid succession. This is accomplished by having two image projectors for scanning the document surface and a selecting means to determine which of the two optical paths will be focused upon the image recording surface. While one image projector is performing a line by line scan operation, the second image projector is returning to a start position so as to be ready for the next scanning operation. Successive scan operations alternately select the optical path of one of the two image projectors.

FIELD OF THE INVENTION

This invention relates to an optical scanning apparatus for transferring an image from a document to a moving electrostatic plate or drum or other image recording surface.

More particularly, this invention relates to an improved image scanner wherein the operation is especially adapted to rapid scanning of the same document and thus allowing additional copies to be made rapidly.

In prior art devices, optical scanners are used to project the image of a document upon a moving photo sensitive plate or drum. After one image has been projected upon the recording surface, the scanner returns to the starting position. This return necessitates a "return period" within the operating cycle of the machine. As a consequence, the speed with which copies of a document can be made in prior art devices is restricted by the time required to scan the document as well as the time required to return the scanning mechanism to the start position.

It is a particular object of this invention to improve the scanning speed of a document copier.

It is another object of this invention to remove the necessity of a rapid return of the scanning mechanism between successive scanning operations.

It is an additional object to provide an optical scanner which is particularly adapted to rapid scanning of the same document.

These and other objects are obtained through a scanning system which employs two possible optical paths. The unique optical scanner described in this invention has two optical projection means which are movable so as to project the document image upon an image storage means. The two projectors move in alternate converging and diverging motion while the required image of the two available images is selected by a shutter means. Thus, in the converging motion of the two image projectors, the image from one projector is allowed to strike the image recording surface while during diverging motion, the image from the other image projector is selected to strike the recording surface.

For a better understanding of this invention as well as other objects, the following detailed description is presented in connection with the accompanying drawings wherein:

FIG. 2 shows one of two preferred embodiments wherein the movable element is a mirror;

FIG. 3 shows a second preferred embodiment wherein the movable element is a lens.

Figures 1A, 1B:
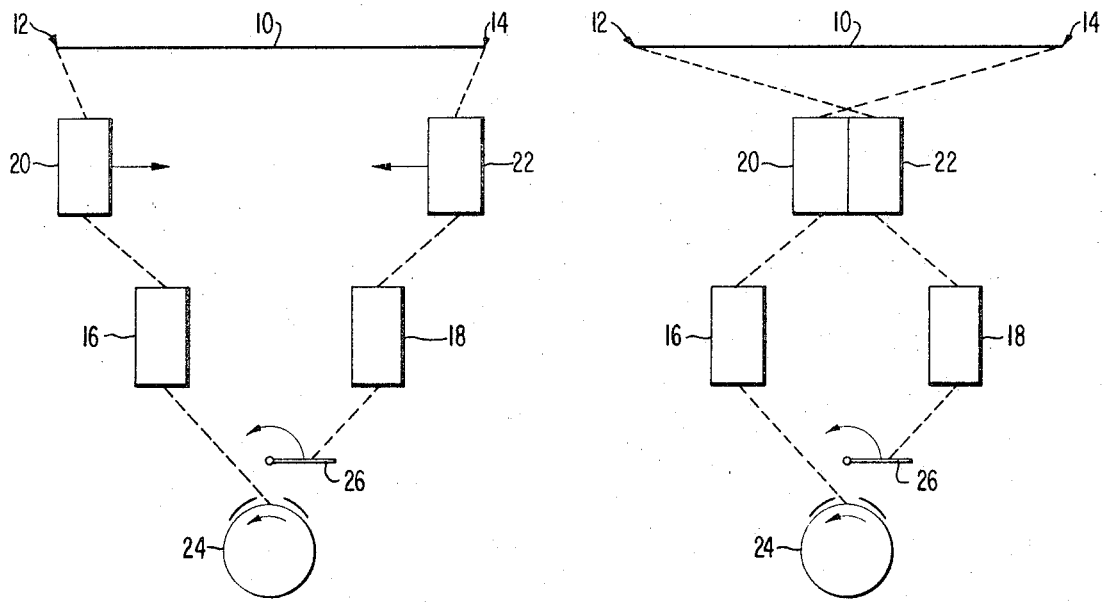
FIG. 1a shows a schematic diagram of the apparatus in the optical position at the beginning of a first scanning operation.
FIG. 1b shows the apparatus in FIG. 1a at the completion of the first scanning operation.

Referring now to the drawings, FIG. 1a shows a schematic diagram of the optical scanning apparatus defined by this invention at a position just prior to a first scanning operation. It should be noted that the elements and operations depicted in FIG. 1 are presented as a symbolic approach to explain the operation of the preferred embodiments shown in FIG. 2 and FIG. 3.

In FIG. 1a a fixed document support 10 is shown having a first edge or left edge 12 and a second edge or right edge 14. Document support means 10 comprises any apparatus for supporting at a fixed position any document desired to be recorded upon image recording surface 24. The document support means 10 might be a glass plate, a means for supporting documents by their edge, or any other means for supporting a document in the relative position as shown.

Elements 20 and 22 are movable image projection means. These projectors are movable from the position shown in FIG. 1a in the direction of the arrows or in a converging motion toward each other. In FIG. 1b, movable image projectors 20 and 22 are shown at the stop position after having moved in converging motion toward each other.

The function of the movable image projection means 20 and 22 is to scan the document supported by the fixed document support means 10 from one edge to the other edge. Movable image projection means 20 is used to scan the document from the first edge 12 to the second edge 14. When the movable image projection means 20 is in the position as shown in FIG. 1a, the left edge 12 is projected into fixed image projection means 16. When movable image projection means 20 has progressed to its fullest extent in converging motion, it will project the image from the right edge 14 into fixed image projection means 16 as shown in FIG. 1b. Thus, as movable image projection means 20 moves from left (the position shown in FIG. 1a) to right (the position in FIG. 1b), the document supported by document support means 10 is scanned from left edge 12 to right edge 14. Movable image projection means 22, while moving in converging motion from the position shown in FIG. 1a to the position shown in FIG. 1b, scans the document held by document support means 10 from the right edge 14 to the left edge 12. During the converging motion, each of the movable image projection means 20 and 22 project in a line by line fashion the image of a document supported by document support means 10 into respective fixed image projection means 16 and 18 as shown by the dotted lines in FIGS. 1a and 1b.

Fixed image projection means 16 collects the image from movable image projector 20 and projects the image upon the recording means 24. Fixed image projection means 16 functions to focus the changing image as projected by movable image projection means 20 upon the image recording means 24. Recording means 24, as shown in the drawings of this application, appears as a drum. In fact, it could be a photo sensitive drum. However, there are other possible forms the image recording means 24 could take on namely, a moving photo sensitive plate a moving photographic film on any other moving surface capable of recording an optical image. Likewise, fixed image projection means 18 is also functional to focus the image from movable image projection means 22 upon image recording means 24. However, as shown in FIG. 1a, the image projected by fixed image projection means 18 is blocked by image selector 26. Thus, during converging motion as depicted in FIG. 1a and FIG. 1b, the image as projected by movable image projection means 20 is the only image which is allowed to strike the image recording means 24, causing the document supported by document support means 10 to be recorded upon the image recording means 24 starting from left edge 12 and progressing to right edge 14 when the movable image projectors are in converging motion.

Figures 1C, 1D:
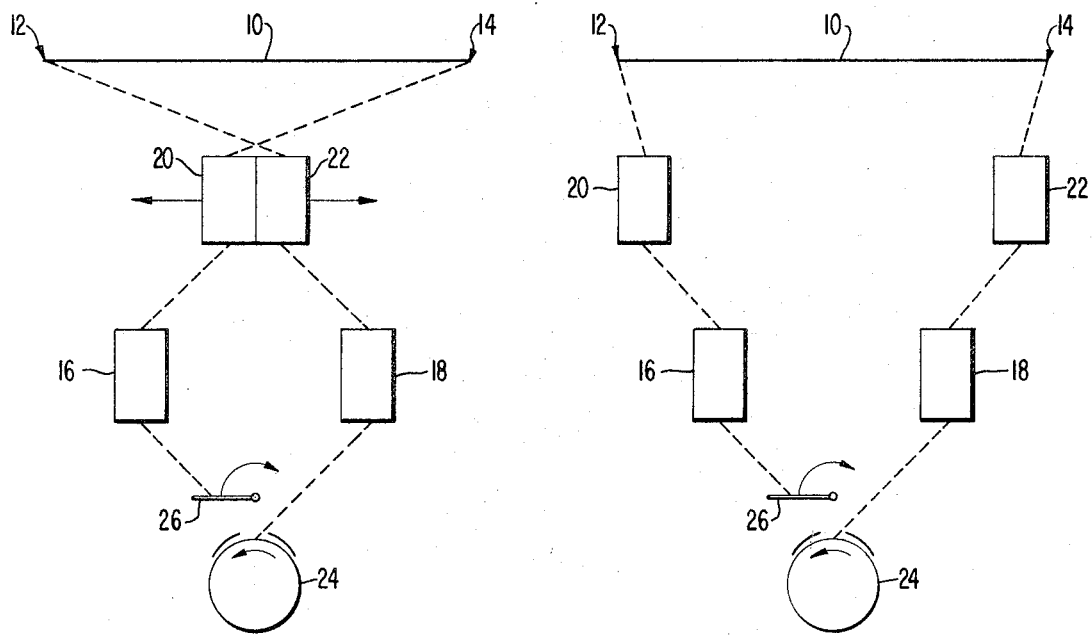
FIG. 1c shows the apparatus in FIG. 1a at the beginning of a second scan operation.
FIG. 1d shows the apparatus in FIG. 1a at the completion of the second scanning operation.

When the scanning apparatus has come to a rest at the position shown in FIG. 1b, the converging motion scan is complete. In order for a second scan operation to begin, image selection means 26 must be moved in the direction as shown in FIG. 1b so as to reach a final position as shown in FIG. 1c. Thus, image selection means 26 moves from selecting the image from fixed image projection means 16 as shown in FIG. 1b to selecting the image projected by fixed image projection means 18 as shown in FIG. 1c. With the movement of image selection means 26 from the position of FIG. 1b to FIG. 1c, a second scanning operation may begin.

The second scanning operation is one wherein the movable image projection means 20 and 22 move in diverging motion, each in the direction of the arrow as shown in FIG. 1c. During diverging motion, image projection means 22 will scan the document from the left edge 12 to the right edge 14 as depicted by the drawings 1c and 1d. During this period of diverging motion, moving image projector means 20 is returning to the start position and scanning the document from right edge 14 to left edge 12, however, the image is blocked from striking image recording means 24 by image selection means 26.

At the completion of the diverging motion mode, the document supported by fixed document support means 10 has been scanned from left edge 12 to right edge 14 through movable image projection means 22 and fixed image projection means 18 and has come to the position as shown in FIG. 1d. Thus, in order to begin the next scanning operation, the image selection means 26 must be moved in the direction as shown in FIG. 1d to the position as shown in FIG. 1a. With the movement of image selection means 26 to the position as shown in FIG. 1a, the converging motion mode may begin again.

Thus, during converging motion, one of the movable image projection means is allowed to project the document supported by document support means 10 upon image recording means 24. Upon completion of the converging motion, the image selection means 26 is changed so as to allow the image of the second movable image projection means to be projected upon image recording means 26. Thus, during diverging motion, the document is scanned by a second movable image projection means in the same direction as the image was scanned during the converging motion mode. The speed of scanning documents in an optical scanner is, therefore, enhanced because the only time delay between one scan operation and the other is caused by the changing of the image selection means from one position to another, rather than, as in prior art devices, returning the whole scanner to a start position. Since the image selector can be operated at very high speeds, the delay between one scan and another is very small.

It should be further noted that the scanning mechanism herein described comprises only a small portion of a document copying machine. Typically, there will be additional processing stations past which the revolving recording means 24 will pass. These stations, not shown in the drawings, are required to transform the recorded image upon recording means 24 into a visual image which is to be presented to the user.

FIG. 2 shows one alternate embodiment. Movable mirrors 42 and 44 perform the function of the movable image projection means 20 and 22 as shown in FIG. 1. The image of the document held by document support means 40 is reflected from movable mirrors 42 and 44 through lens 46. One of the two optical image paths is blocked by shutter means 48. Shutter means 48 is a semicircular disc mounted upon a shaft so as to allow the shutter means 48 to block the optical path from either movable mirror but not both at the same time. The image not blocked, passes through the lens and reflects from fixed mirror 50 or 52 depending upon the position of shutter means 48. The image reflected from the fixed mirror is focused upon the image recording surface 56. Light shields 54 and 68 form a narrow slit-like opening along the length of the image recording surface 56, and only allow light passing through the slit to "expose" the image recording surface 56. The width between the two light shield elements must be small so as to focus only a small portion of the document upon the image recording surface, the smaller the opening the sharper the image recorded.

Movable mirrors 42 and 44, while at position 1, are at the beginning point of a converging motion scan operation. During a converging motion scan operation, movable mirrors 42 and 44 converge toward each other from position 1 to the final stop position, position 2. With the shutter means 48 in the position as shown, the document upon document support means 40 is effectively scanned from the right edge to the left edge. When shutter means 48 is rotated 180° clockwise about the axis 60, the optical scanner is ready for a second scan operation or a diverging motion scan. During a diverging motion scan, movable mirrors 42 and 44 diverge from each other from position 2 to a final stopping position, position 1. After a diverging motion scan, returning shutter means 48 to the position as shown in FIG. 2 prepares the optical scanner for a subsequent converging motion scan operation. Thus, during converging motion, the document supported by document support means 40 is scanned from right to left by movable mirror 44 and during diverging motion the document is scanned from right to left by movable mirror 42.

FIG. 3 shows a second embodiment of this invention. Document support means 70 holds the document such that the movable lens and fixed mirror optical system can focus the image of the document upon recording surface 88. Movable lenses 72 and 74 are shown in a position prior to a diverging motion scan operation, at position 1. During a diverging motion scan operation, shutter means 90 is positioned such that the image projected from movable lens 72, fixed mirror 76, and fixed mirror 82 is blocked from striking the image recording means 88. The document will be scanned during a diverging motion scanning operation from left to right, the image being projected upon image recording means 88 by movable lens 74, fixed mirror 78, and fixed mirror 80. Light shields 84 and 86 provide a small slit-like opening and allow only a small portion of the image of the document to be focused upon image recording means 88. At the end of a diverging motion scan operation, the movable lenses 72 and 74 are stopped at position 2. When shutter means 90 is pivoted clockwise about axis 92, the image as projected by movable lens 72, fixed mirror 76, and fixed mirror 82 is projected upon image recording means 88 while the optical path through movable lens 74, fixed mirror 78, and fixed mirror 80 is blocked. A converging motion scan, movable lenses 72 and 74 moving from position 2 to position 1, allows the document to be scanned from left to right. Thus, during diverging motion, the document is scanned from left to right through the optical path comprising movable lens 74, fixed mirror 78 and fixed mirror 80 and during converging motion the document is scanned from left to right through the optical path comprisig movable lens 72, fixed mirror 76, and fixed mirror 82.

Through the use of movable mirrors or movable lenses, a high speed shutter mechanism, and other optical elements, a high speed optical scanner can be produced which eliminates the necessity of the rapid return of optical scanning mechanisms found in current optical copiers. While the invention has been particularly shown and described with reference to preferred embodiments thereof, it will be understood by those skilled in the art that various changes in form and details may be made therein without departing from the spirit and scope of this invention.

For example, the movable image projection means as shown in FIGS. 1–3 move in a plane parallel to the document support. It will be readily recognized by those skilled in the art, that modifications to the optical system can easily be made such that the movable image projection means will move along paths, which may be lines or arcs, not parallel to the support means. In addition, it will be recognized by those skilled in the art that the document support need not be a flat surface. However, if such a modification is made, additional appropriate modifications must be made to the optical paths in order to insure proper functioning of this invention.

What is claimed is:

1. An optical device for scanning documents comprising:
   a fixed document support means for holding a document, said document support means having a first and second edge, each edge at opposite ends of said document support means;
   a first and second image projection system;
   an image recording surface;
   means for moving said image projection systems such that said first image projection system scans said document from said first edge to said second edge and projects said document upon said image recording surface while said second image projection system scans said document from said second edge to said first edge and capable of projecting said document upon said image recording surface during a first scan mode, and for moving said image projection systems such that said first image projection system scans said document from said second edge to said first edge and capable of projecting said document upon said image recording surface while said second image projection system scans said document from said first edge to said second edge and projects said document upon said recording surface during a second scan mode; and
   an image selection means for allowing the image projected by said first image projection system to strike said image recording surface while preventing the image projected by said second image projection system from striking said image recording surface during said first scan mode, said image selection means operable to allow the image projected by said second image projection system to strike said image recording surface while preventing the image projected by said first image projection system from striking said image recording surface during said second scan mode.

2. An optical device for scanning documents comprising:
   a fixed document support means for holding a document, said document support means having a first and second edge, each edge at opposite ends of said document support means;
   a first and second image projection system, each system having a fixed optical portion and a movable optical portion;
   an image recording surface;
   means for moving said movable optical portions so that said first image projection system scans said document from said first edge to said second edge and projects said document upon said image recording surface while said second image projection system scans said document from said second edge to said first edge and capable of projecting said document upon said image recording surface during a first scan mode, and for moving said movable optical portions so that said first image projection system scans said document from said second edge to said first edge and capable of projecting said document upon said image recording surface while said second image projection system scans said document from said first edge to said second edge and projects said document upon said image recording surface during a second scan mode; and
   an image selection means for allowing the image projected by said first image projection system to strike said image recording surface while preventing the image projected by said second image projection system from striking said image recording surface during said first scan mode, said image selection means operable to allow the image projected by said second image projection system to strike said image recording surface while preventing the image projected by said first image projection system from striking said image recording surface during said second scan mode.

3. An optical device for scanning documents comprising:
   a fixed document support means for holding a document, said support means having a first and second edge, each edge at opposite ends of said fixed document support means;
   a first and second fixed image projection means;
   a first and second movable image projection means, said first movable image projection means for projecting the image of a document supported by said fixed document support means into said first fixed image projection means, said second movable image projection means for projecting the image of a document supported by said fixed document support means into said second fixed image projection means;
   means for moving said first movable image projection means so as to scan the image of said document from said first edge to said second edge while said second movable image projection means is movable so as to scan the image of said document from said second edge to said first edge, both movements occurring simultaneously during a first scan mode, and for moving said first movable image projection means so as to scan said document from said second edge to said first edge while said second movable image projection means is movable so as to scan said document from said first edge to said second edge, both movements occurring simultaneously during a second scan mode;
   an image recording means;
   a selection means, said selection means being positioned to allow projection of the image of said document through said first fixed image projection means to said image recording means while blocking the image projected by said second fixed image projection means during said first scan mode, said selection means being positioned to allow projection of the image of said document through said second fixed image projection means to said image recording means while blocking the image projected by said first fixed image projection means during said second scan mode.

4. The optical device for scanning documents of claim 3 wherein said first and second movable image projection means are each a lens.

5. The optical projection device for scanning documents of claim 3 wherein said first and second movable image projection means are each a mirror.

6. An optical device for scanning documents comprising:
a fixed document support means for holding a document;
a first and second image reflection means;
means for moving said first and said second image reflection means in alternate converging and diverging motion, said first and second image reflection means providing two optical paths for the image of said document;
an image recording surface;
focusing means located between said first and second image reflection means and said image recording surface for focusing the image from each of said two optical paths upon said image recording surface; and
a selecting means for selecting which of two optical paths is to be projected upon said image storage means, said selection means operational to select the path from said first image reflection means during said converging motion and operational to select the path from said second image reflection means during said diverging motion.

7. An optical device for scanning documents comprising:
a fixed document support means for holding a document;
a first and second focusing means;
means for moving said first and second focusing means in alternate converging and diverging motion, said first and second focusing means producing two optical paths for the image of said document;
an image recording surface;
a reflecting means located between said first and second focusing means and said image recording surface, said reflecting means operational to reflect the images of said two optical paths upon said image recording surface; and
selecting means for selecting which of said two optical paths are to be directed upon said image storage means, said selection means operational to select the optical path from said first focusing means during said converging motion and operational to select the optical path from said second focusing means during said diverging motion.

References Cited

UNITED STATES PATENTS

| | | | |
|---|---|---|---|
| 2,844,648 | 7/1958 | Rosenthal | 178—7.6 |
| 2,914,609 | 11/1959 | Blackstone | 178—7.6 |
| 3,109,057 | 10/1963 | Slavecki | 178—7.6 |

ROBERT L. GRIFFIN, Primary Examiner

J. A. ORSINO, Jr., Assistant Examiner

U.S. Cl. X.R.

350—6, 285